April 3, 1951 R. F. McKIEVER 2,547,482

WIRE CONTACT STORAGE UNIT

Filed June 21, 1949 6 Sheets-Sheet 1

INVENTOR
ROBERT F. McKIEVER
BY Robert S. Dunham
ATTORNEY

April 3, 1951 R. F. McKIEVER 2,547,482

WIRE CONTACT STORAGE UNIT

Filed June 21, 1949 6 Sheets-Sheet 2

INVENTOR
ROBERT F. McKIEVER
BY Robert S. Dunham
ATTORNEY

April 3, 1951 R. F. McKIEVER 2,547,482

WIRE CONTACT STORAGE UNIT

Filed June 21, 1949 6 Sheets-Sheet 3

INVENTOR
ROBERT F. McKIEVER
BY Robert S. Dunham
ATTORNEY

April 3, 1951 R. F. McKIEVER 2,547,482

WIRE CONTACT STORAGE UNIT

Filed June 21, 1949 6 Sheets-Sheet 4

INVENTOR.
ROBERT F. McKIEVER
BY *Robert S. Dunham*
ATTORNEY

April 3, 1951 R. F. McKIEVER 2,547,482

WIRE CONTACT STORAGE UNIT

Filed June 21, 1949 6 Sheets-Sheet 5

INVENTOR.
ROBERT F. McKIEVER

BY Robert S. Dunham

ATTORNEY.

April 3, 1951 R. F. McKIEVER 2,547,482

WIRE CONTACT STORAGE UNIT

Filed June 21, 1949 6 Sheets-Sheet 6

INVENTOR.
ROBERT F. McKIEVER
BY Robert S. Dunham
ATTORNEY.

Patented Apr. 3, 1951 2,547,482

UNITED STATES PATENT OFFICE 2,547,482

WIRE CONTACT STORAGE UNIT

Robert F. McKiever, Endicott, N. Y., assignor to International Business Machines Corporation, New York, N. Y., a corporation of New York Application June 21, 1949, Serial No. 100,395

12 Claims. (Cl. 235—61.6)

This invention relates to storage devices and more particularly the invention relates to an electrical storage device for use in connection with electric accounting and computing machines, and it has particular utility in accounting and computing systems which operate under control of perforated record cards.

Information from a source such as a perforated record card may be sensed concurrently, or it may be sensed column by column. Accordingly, provision must be made for either a concurrent entry or column by column entry into a data storage device. Information read out from the storage device must be read out either concurrently or column by column, depending upon the type of device which is to receive the stored information.

Accordingly, storage devices of this class must be functionally adapted to store information and to make available such stored information in a plurality of different ways. In the example herein given, the information is entered into the storage device column by column and is read out of the storage device concurrently. It is to be understood, of course, that the device is adapted for use in systems requiring concurrent entry and column by column readout. Other storage and read out conditions to which the device is adapted include column by column entry and column by column readout, as well as concurrent entry and concurrent readout.

It is, therefore, the general object of the invention to provide a storage unit which is applicable to the various entry and readout conditions, and it is a specific object of the invention to provide a storage device which is relatively simple in its structure and operative under the influence of electromagnetic operating devices.

In its present embodiment the storage device includes a plurality of storage positions, the number of which are ordinarily determined by the field of a record source from which information is to be stored. It is a further object of the invention to provide a storage device having normally open contacts constituting storage positions and means for electromagnetically closing and latching such contacts to constitute closed storage positions which constitute control circuits for perforated record controlled machines.

Further objects, advantages and features of the invention and the system for its control will become clear as the following specification is read in light of the drawings, in which Figure 1 is a plan view of the storage unit;

Fig. 2 is a fragmentary, enlarged, sectional view on line 2—2 of Fig. 1;

Figs. 3 through 8 diagrammatically illustrate successive positions of a flexible storage conductor as it moves from unlatched to latched and subsequent unlatched position;

Figure 1:
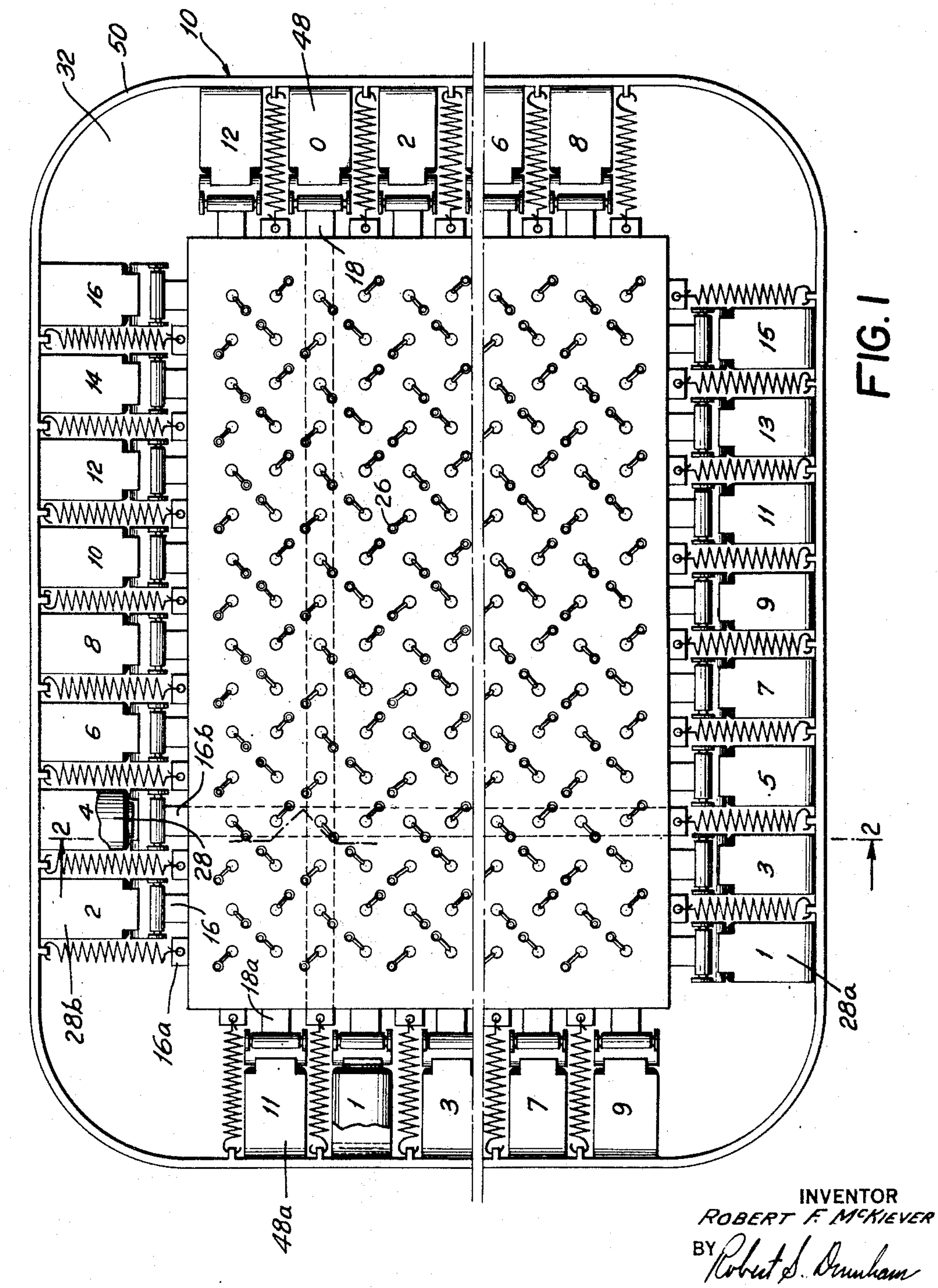

The storage device 10 herein includes a pair of fixed plates 12 and 14 disposed in spaced relation to each other. The plate 12 may be designated as the base plate, and the plate 14 may be designated as the face plate. The plates 12 and 14 are spaced from each other a sufficient distance to accommodate between them a pair of intersecting slide members 16 and 18, which are adapted to reciprocate in grooves in the confronting faces of the plates 12 and 14.

Conductor passages 20, 20$a$, 20$b$ and 20$c$ are formed through the face plate 14, the slides 18 and 16 and the base plate 12, respectively. These passages are at the point at which the slides intersect, and they are in substantial alignment when the slides are in their normal position of repose. The passage 20$c$ through the base plate 12 is preferably square to permit the unobstructed diagonal movement of a flexible conductor as will appear more fully hereinafter.

A contact latch 22 is fixed in the base plate 12 at a point which permits a hooked portion 22$a$ to extend into the mouth of the base plate passage 20$c$. A conductor 24 herein shown has a flexible wire which extends through the aligned passages in the plates and the slides. The conductor 24 has one end thereof attached to a plug socket 26 which is mounted in the face plate 14 adjacent the mouth of the passage 20 therein. The opposite free end of the conductor 24 extends to the mouth of the passage 20$c$ of the base plate 12 where it occupies a normal position diagonally disposed with respect to the latch hook 22$a$. When the conductor 24 is flexed out of its normal position by reciprocation of the slides 16 and 18, the free end thereof may be latched behind the hook 22a of the contact member 22. If, thereafter, a current is impressed on the plug socket 26, the same will be conducted through the conductor 24 and into the contact member 22, from which the current may be conducted to current controlled devices as will appear more fully hereinafter.

Figures 2, 3, 4, 5, 6, 7, 8:
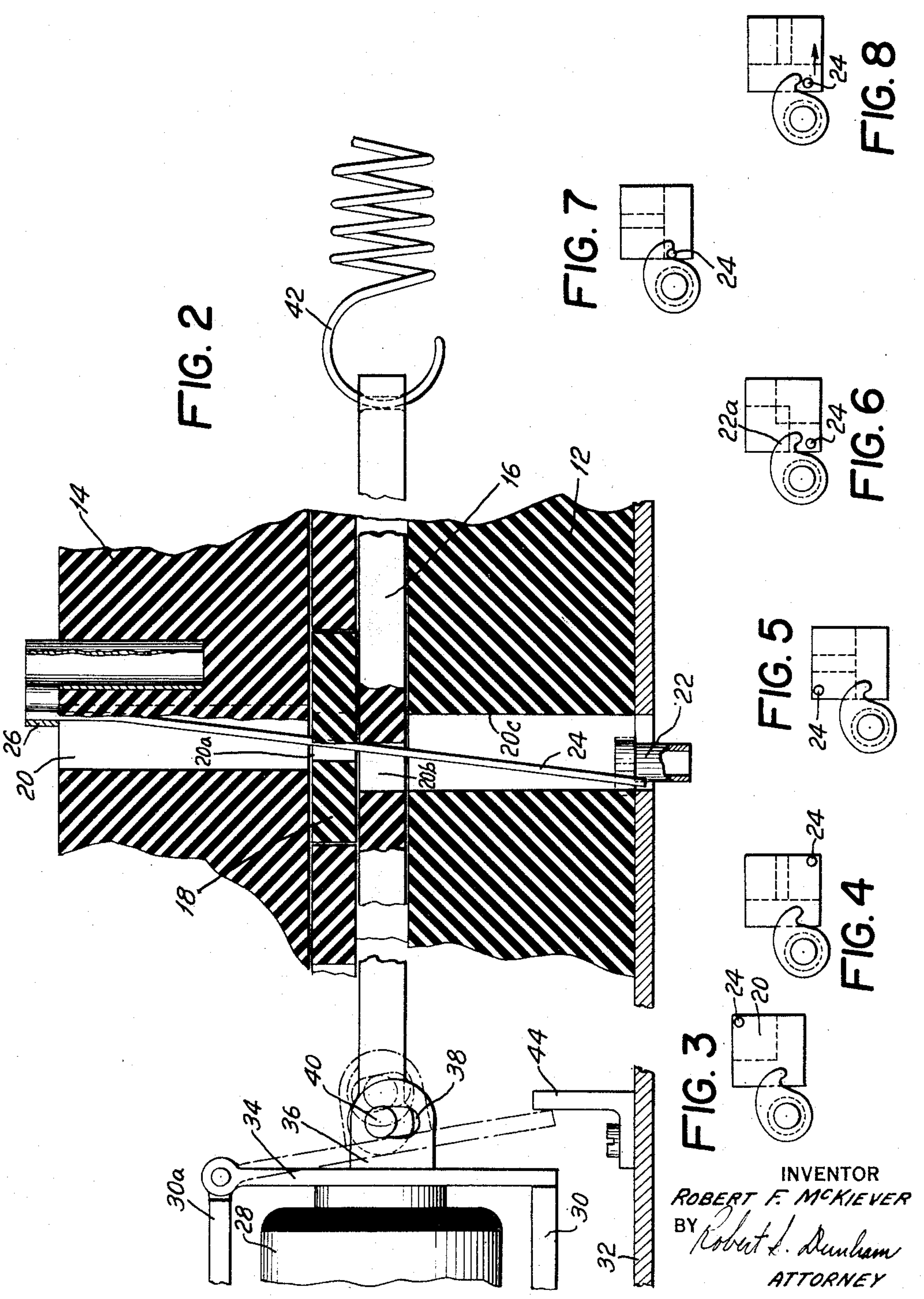

Since the storage device has been designed for operation in an automatic control circuit, there has been provided electromagnetic means for reciprocating the slides 16 and 18. Accordingly, an electromagnet 28 is mounted on a magnet yoke 30 which is supported on a base frame 32 of the device. The upper leg 30a of the yoke 30 has pivoted thereto an armature 34 which is attracted to the core of the magnet 28 whenever the magnet is energized. The armature 34 has a lug 36 extending forwardly therefrom, and this lug has a vertically disposed elongated slot 38 formed therein to accommodate a pin 40 extending from one end of the slide 16 as shown in Fig. 2.

The other end of the slide 16 has a tension spring 42 attached thereto, the opposite end of the spring being attached to the supporting frame. The tension of the spring 42 is such that the slide 16 is normally biased to the right as viewed in Fig. 2 of the drawing, with the result that the armature 34 is normally in the dotted line position in contact with a stop member 44, which is supported on the base frame 32. When the magnet 28 is energized, the slide 16 will be reciprocated to the left against the tension of the spring 42, as viewed in Fig. 2, thereby flexing the conductor 24 in the direction of slide movement by engagement with the wall of the passage 20b. Upon deenergization of the magnet 28, the spring 42 will return the slide 16 to its normal position at the right of Fig. 2.

Hereinabove the operating mechanism for the slide 16 has been described in specific detail. It is to be understood that the operating mechanism for the slide 18 is identical in structure and operation, with the exception that the parts are so disposed as to move the slide 18 in an intersecting path with respect to the slide 16. Reference to Fig. 1 of the drawings will show that the electromagnet 28 is located along one side of a supporting frame 32 while a magnet 48 in control of the slide 18 occupies a position on the frame 32 which is angularly removed from the magnet 28 by ninety degrees. As a result of this disposition of the respective slides and their operating magnets, the slides 16 and 18 intersect each other and operate in substantially perpendicular direction to each other.

Figs. 3 through 8 illustrate the conductor latching action of the slides 16 and 18. The lower end of the conductor 24 is normally disposed in a substantially vertical position in that corner of the base plate passage 20c which is diagonally disposed with reference to the latch hook 22a. When the slide 18 is reciprocated by its magnet, the wall of the passage 20a in the slide will engage the conductor and flex the same in the direction of slide movement. The free end of the conductor, therefore, upon operation of the slide 18, will be positioned to the rear of the latch hook 22a. The slide 18 is conditioned to hold the conductor in such flexed position until the slide 16 is operated by its magnet 28. Upon operation of the slide 16, the conductor will be further flexed in a path extending along the latch hook 22a to a latching position in front of the hook. When the conductor has reached this latter position, the slide 16 is first released and this causes the conductor to latch behind the hook. Thereafter, the slide 18 may be released without disturbing the latched position of the conductor.

Fig. 3 shows the normal position of the conductor 24 extending through the conductor passage, Fig. 4 shows the position to which the free end of the conductor 24 is moved upon operation of the slide 16 and Fig. 5 shows the position of the free end of the conductor 24 resulting from reciprocation of the slide 18. Fig. 6 shows the position of the conductor 24 upon operation of both slides 16 and 18 and just prior to release of the slide 16, and Fig. 7 shows the position of a latched conductor after the slide 16 has been returned to its normal position under the influence of the spring 42. Fig. 8 shows the position of the free end of the conductor 24 upon operation of the slide 18 to release the conductor from its latched position behind the contact hook 22a.

Since the storage device is adapted to receive and store information from selected fields of a control source, such as a perforated record card, it is contemplated to provide in the device a plurality of storage positions, each position being represented by a storage conductor and its associated mechanism. Herein, as represented in Fig. 1 of the drawings, there has been provided a device consisting of a plurality of storage positions in which the positions are in vertical and horizontal alignment with each other. This, of course, requires that a plurality of parallel slides 16 be disposed between the spaced plates 12 and 14 and that a second set of parallel slides be disposed between these plates in intersecting relation with respect to the first set of slides. Herein, therefore, a through passage is provided in the plates 12 and 14 and in the slides 16 and 18 wherever two slides intersect, each passage being equipped with a flexible conductor, as described hereinabove with reference to Fig. 2 of the drawings. The capacity of the storage device will ordinarily be determined by the data field of a record source from which information is to be stored.

In Fig. 1 there are shown by way of example twelve transverse slides and sixteen longitudinal slides resulting in 160 storage positions adapting the device to storage from ten columnar index point positions of a perforated record card and a record field of sixteen columns of such card. It will be convenient for the purpose of this description to refer to the transverse slides as columnar slides, and to the longitudinal slides as digital slides. The manner in which the device is oriented in a record controlled system will appear more particularly hereinafter.

The base member 32 is provided with an upstanding peripheral flange 50, in which the elements of the storage device are positioned. With particular reference to Fig. 1 of the drawings, it will be noted that all of the slides are adapted for operation by electromagnets positioned at opposite sides of the frame. Alternate, parallel, columnar slides 16 are operated in opposite directions by electromagnets located at opposite sides of the frame structure. Thus, the electromagnet 28a, which is in control of the first columnar slide at the left of Fig. 1, will when energized draw the slide 16a in one direction, whereas the electromagnet 28b, which is in control of the second columnar slide 16b, will draw the slide 16b in the opposite direction, etc. Similarly, the alternate parallel digital slides, which are disposed longitudinally as viewed in Fig. 1, are adapted to operate in opposite directions under the influence of their related electromagnets, which are disposed at opposite ends of the frame member 50. Consequently, the slide 18 is drawn in one direction by its magnet 48 when the latter is energized, while the slide 18a is operated in the opposite direction by its magnet 48a when the latter is energized, etc.

Figure 9:
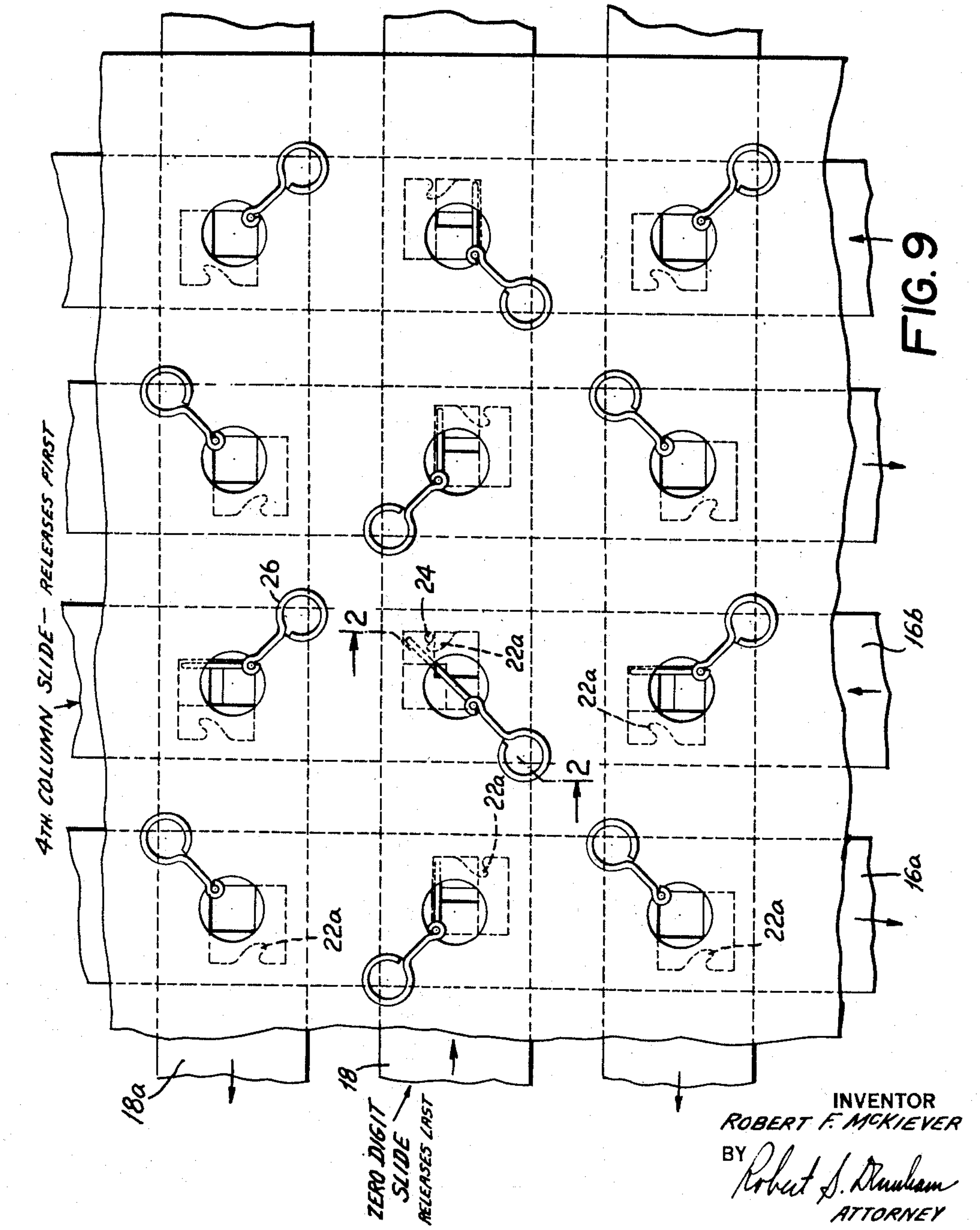
Fig. 9 is a fragmentary, enlarged, plan view of the storage device, the position of latch hooks for associated conductors being shown in diagrammatic manner.

Because the alternate slides of the respective columnar and digital groups operate in opposite directions, it is necessary to dispose the contact latches 22 so that the conductor hooks 22a thereof are properly positioned to receive and latch a flexible conductor when flexed into latching position by operation of the intersecting slides through which it passes. Fig. 9 of the drawings will illustrate the manner in which the hooks of the successive columnar and digital positions are disposed for the latching of their respective conductors. Each hook 22a projects into the lower end of its related base plate passage 20c at the side nearest the operating magnet of its associated digit slide, and each hook has its free end pointed in the direction opposite to that in which its related slide 18 is moved by its actuating magnet so that a given point of a digit slide passes from the free end of the hook toward the base thereof as the slide is operated by its magnet. Furthermore, the free end of the hooks extend toward the operating magnets of the respective column slides, i. e. the free end of the hooks are so disposed that a given point of a column slide will pass from the rear of a hook to beyond the free end thereof as it is operated by its magnet. For example, the fact that columnar slide 16a is pulled downwardly by its operating magnet dictates that the latch hooks 22a of the related connectors 22 be pointed downwardly. The digit slide 18a, being operable to the left by its magnet, requires that the contact hooks 22a, related to the slide 18a, be disposed at the left of base plate passages in the digital positions influenced by that slide.

As hereinbefore stated it is contemplated that the storage wires 24 be flexed diagonally from their normal position of suspension from the plug ferrule 26 when in latched position, and to this end the plug ferrules 26 must be disposed over alternately opposite edges of the base plate passages 20c, either at the upper or lower edge thereof, depending on the movement of the conductors resultant from the movement of the column and digit slides.

Fig. 9 shows a conductor 24 biased into and latched in conducting position at the intersection of the slides 16b and 18. Reference to Fig. 1 of the drawings will show this to be the zero digital position in the fourth column. This conductor was effectively latched by the reciprocation of the slides 16a and 18 under the influence of their operating magnets. Operation of the digit slide 18 resulted in the flexing of the wire 24 and the positioning of the free end thereof behind the latch hook 22a. The subsequent reciprocation of the column slide 16b thereafter further flexed the conductor 24 along the hook 22a with its free end extended in latching position beyond the point of the hook. From this position the flexed wire lodges behind the latch hook following release of the column slide 16b. A wire so latched in conducting position will remain in that position and effectively transmit electrical impulses from its plug socket 26 to its contact latch 22, or vice versa, until the column slide 16b is again reciprocated, such reciprocation being effective to release the conductor 24 from engagement with the hook 22a.

For ease of description the magnets 28 may be referred to as column magets, and the magnets 48 may be referred to as digit magnets. This description is purely arbitrary, because it bears no fixed relation to the manner in which digits may be stored in the device.

Figure 10:
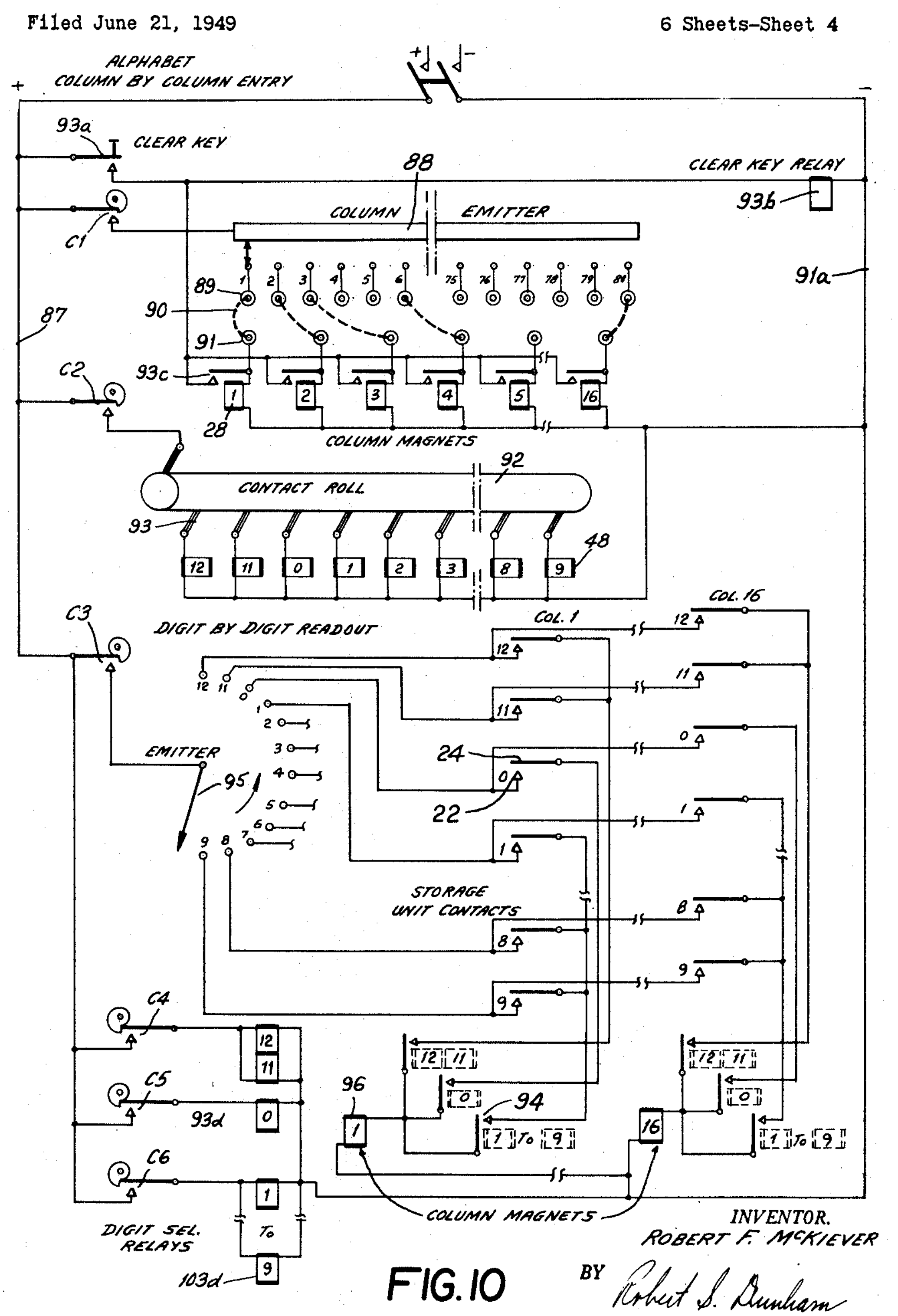
Fig. 10 is a wiring diagram showing the storage device oriented in a control system for alphabet column by column entry and concurrent readout.

It has been assumed herein that the storage device is adapted for use in electric accounting or computing systems in which perforated record cards are used to control the operation of accounting, computing or like machine. Fig. 10 of the drawing illustrates a system in which the storage device is oriented for column by column entry of data from a perforated record card and for concurrent readout from the storage unit for the operation of control magnets or the like.

The manner in which the storage device operates in a control system may be determined by reference to Fig. 10 of the drawings, wherein a perforated record card is read column by column in a card sensing station. A contact C—1 closes each time a given column of a record card is read. A circuit is established from the line 87 through the closed contact C—1, through a column emitter 88 which comprises a common conductor, a series of contacts (one for each card column), a carriage which moves along the contacts in timed relation to passage of a card, column by column, through a card sensing station, and bridging brushes carried by the carriage and adapted to close a circuit from the common conductor to the contacts successively as the carriage escapes from column to column position, all as shown in U. S. Patent No. 2,059,793, to Lang, through exit hubs 89, through plug wires 90, through entry hubs 91, to energize a selected column magnet 28 and from thence to the line 91a.

As a result of the circuit that has been established in this manner, the column slide 16, under the influence of its energized magnet, will be reciprocated and flex the associated flexible contact elements into position for subsequent latching. Following energization of one or more column magnets, a contact C—2 closes to permit circuits to be completed from the line 87, through the closed contact C—2, to a contact roll 92 to columnar alphabetic code holes in a perforated record card, through brushes 93 and to the respective digit magnets 48, thereby reciprocating the selected digit magnets and latching the contact wires at the point of intersection of the reciprocated column and digit slides. Upon deenergization of the digit magnets, and the consequent release of the operating slide, of which selected latched contact wires will remain latched in closed position, while other contact wires that were flexed but unlatched are permitted to return to their normal position of repose.

In a manner conventional to column by column sensing devices, the card is advanced to the next succeeding column and the storage cycle is repeated to store data in the next succeeding column or positions of the storage device. Contacts C—1 and C—2 are timed by rotating cams or other mechanically actuated devices, well known in the art or magnetically actuated so that C—1 closes before C—2, as indicated hereinabove.

For the storage of numerical data a single contact wire will be latched in closed position. In the system represented in Fig. 10 it is also possible to store alphabetical data. In the latter case a two hole code is used, as is well known, and two contact wires will be latched in a given column to represent a letter.

Once information has been stored in the storage device, the same may be maintained therein for repeated readout, but should it be desired to clear the storage device it is necessary merely to close a clear key 93a which completes a circuit to a clear relay 93b. One associated clear relay contact 93c connects the clear key 93a to each of the column magnets 28, so that all column slides are operated to release latched contact wires and permit restoration of the same under the influence of their natural resilient characteristics.

Concurrent readout of information stored in the storage device in the manner hereinabove described, is achieved through the use of a digit emitter synchronized with a recording mechanism or the like, so that the storage device is scanned concurrently. Assuming that a "Z" is stored in column one, then according to the alphabetic code shown in U. S. Patent No. 2,501,271 to Ghertman, for example, 9 and zero impulses must be emitted to the magnet of the recording device that is connected to column one.

The first circuit completed is at the 9 point of the impulse cycle by a cam contact C—6 to the 1–9 digit selection relay coils. This circuit is from the line 87, contact C—6 to the digit selection relay pick-up coils 93d, and to the line 91a. The points 88 of the selection relays are now closed so that a circuit at "9" time is completed from the line 87, through contact C—3, through the 9 spot of the emitter 95, through the closed 9 contact of column one of the storage device, to the 1–9 column selection relay points 94 to the column one magnet 96 of the recording device or the like. The "9," whether numeric or part of an alphabetic code set-up, in any other column of the storage unit will complete similar circuits at the same time as for column one.

The emitter 95 advances to the end of "1" time impulsing the recording control magnets 96 according to the setting of the storage unit. The contact C—6 opens to drop out the 1–9 selection relays 93d, and the contact C—5 closes to energize the zero digit selection relay 93d. Since zero is a part of the "Z" code in this example, when C—3 closes at "zero" time a circuit is completed from the line 87, through the contact C—3, to the zero spot on the emitter 95, and through the closed zero contact of the storage unit, points of the zero digit selection relay 94, to the corresponding magnet 96 in column one that was energized for a "9."

At the end of the zero impulses C—5 opens to deenergize the zero selection relay 93d and the cam contact C—4 closes to pick up the 12—11 digit selection relay 93d and the 12 and 11 zone storage circuits are conditioned for readout. Readout selection relays 93d prevent back circuits that would exist if the numerical and zone contacts were commoned and the alphabetic data were set up by closure of two contacts in any given column.

For column by column entry and concurrent readout, therefore, the magnets 28 were under the control of a timed impulse device, whereas the magnets 48 were under the control of card perforations. In order to adapt the storage device to concurrent entry and column by column readout, it is necessary to orient the storage device in the control system so that the magnets 28 are under the control of card perforations whereas the magnets 48 are under the control of a timed impulse emitter, appropriate change in timing being made so that the slides 16 are operated by their respective magnets 28 prior to the operation of the slides 18. This timing sequence must prevail whether the information is stored in the storage device concurrently or whether it is stored in column by column manner.

Figure 11:
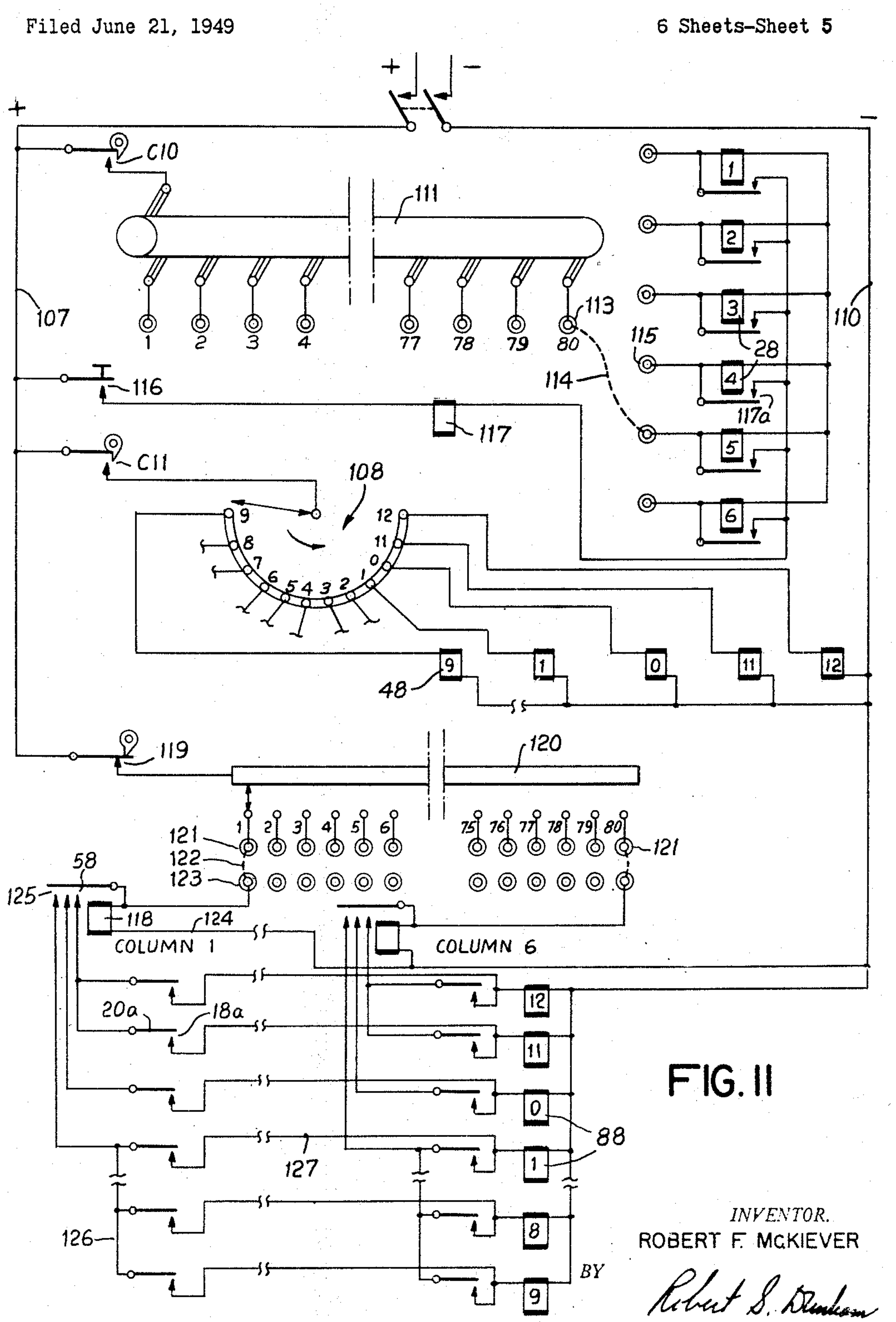
Fig. 11 is a wiring diagram showing the storage device oriented in a control system for numeric concurrent entry and column by column readout.
Figure 12:
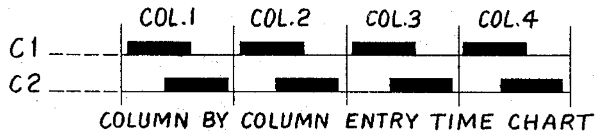
Fig. 12 is a timing chart for column by column entry.
Figure 13:
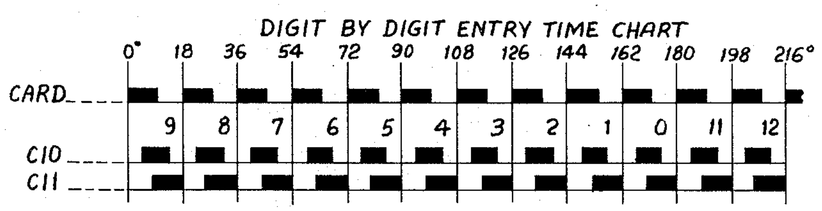
Fig. 13 is a timing chart for concurrent entry.
Figure 14:
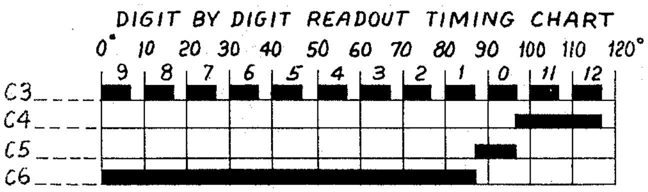
Fig. 14 is a timing chart for concurrent readout.

Fig. 11 of the drawings diagrammatically illustrates a system wherein information may be sensed concurrently from a perforated record card and stored concurrently in the storage device for subsequent column by column readout. For example, just before the "5" index point positions of a card are sensed, a circuit is completed from the line 107, through cam contact C—10, the "5" hole or holes of the card, contact roll 111, brushes 112, exit hubs 113, plug wire 114, entry hubs 115, and the "5" magnet 28 to the line 110. This operates the slide 16 at the "5" digit position in all columns in which a 5 is to be stored under card control. The associated conductor wires are thereby flexed into an initial or preliminary position from which they may be latched. After the magnets 28 have been energized and while the same are held energized, cam contact C—11 closes. This completes a circuit from the line 107 through the now closed cam contact C—11, the five spot of the emitter 108, the five digit magnet 48, and to the line 110. When this circuit is established, the "5" digit slide will be reciprocated to latch the conductor wires of the respective "5" positions to be stored. The cam contact C—10 thereafter opens and breaks the circuit to the magnets 28 so that conductors for which digit slides were operated under the control of the emitter 108 remain latched, and conductors that were not latched will return to normal position. When the control card advances to the next succeeding index point positions, the storage cycle is repeated in smilar fashion, thereby storing in the storage device digit after digit until the whole of the data is stored.

After the desired data has been stored in the storage device, its stored condition will remain for repeated subsequent readout until a reset magnet is energized. Upon such energization the latch conductors are released and the device is conditioned for further storage. Clearing of a stored setup is achieved by closure of a clear key 116, which energizes a clear relay 117 whose points 117a connect the clear key to each of the column slide operating magnets 28 so that all the column slides are operating. Therefore, all of the latched conductors will be restored to their normal open position, as explained in connection with the system shown in Fig. 10.

Because a separate contact is provided for each index point position for each column, the typical back circuits that have to be eliminated when more than one circuit connects to a given buss are herein eliminated by insertion of relay points 125. Assuming a "5" was stored in column 1, the "5" contact in that column would be closed. The recording device that is advancing in column by column manner closes a circuit breaker contact 119 (Fig. 11) to complete a circuit from line 107, the circuit breaker contact 119, a column emitter 120, the "1" exit hub 121, the plug wire 122, the entry hub 123, line 124, the selector relay coil 118 to line 110. Energization of the coil 118 distributes the circuit to the three points 125 of the relay. The point 125 at the left, as shown in Fig. 11 of the drawing, follows the common connection 126 from column one contacts "9"—"1" through "1" column contact. line 127 to the "5" magnet 88, which is under control of the closed storage point. Thus, the "5" magnet is adapted to operate a recording device such as a step by step duplicator summary punch as shown in Maul Patents Nos. 1,896,551 and 1,946,913 and Lee and Daley Patent No. 1,976,618.

The recording mechanism advances the column emitter 120 to the next column or position so that similar circuits are completed for the next storage column in accordance with the data stored.

Having described the invention in a mechanical embodiment and having shown the embodiment in an operative system, it is deemed that the nature and operation of the invention has been adequately described without resort to illustration of the systems in which the storage device may be useful. The practice of the invention is, therefore, not limited to the specific illustration but the scope thereof is illustrated in the following claims.

What is claimed is:

1. An electrical storage device comprising, a pair of plates fixed in spaced relation to each other, a plurality of slides disposed between said plates in parallel relation to each other, a plurality of parallel slides disposed between said plates in intersecting relation with respect to first named slides, an aligned passage through said plates and said slides at the points at which said slides intersect, a contact at each of the passages in one of said plates, a conductor in each of said aligned passages, one end of said conductors being attached to said other plate and having their free ends adjacent their respective contacts, electromagnetic means for imparting reciprocation to the parallel slides of one set to move the free ends of the conductors passing therethrough into contact position with respect to their respective contacts, electromagnetic means for imparting reciprocation to the intersecting slides to move the conductors into latched contact with their respective contacts, means for selectively energizing said electromagnetic devices, and means for impressing a current on conductors in contact with their respective contacts.

2. An electrical storage device comprising, a pair of plates fixed in spaced relation to each other, a plurality of slides disposed between said plates in parallel relation to each other, a plurality of parallel slides disposed between said plates in intersecting relation with respect to first named slides, an aligned passage through said plates and said slides at the points at which said slides intersect, a contact at each of the passages in one of said plates, a conductor in each of said aligned passages, one end of said conductors being attached to said other plate and having their free ends adjacent their respective contacts, electromagnetic means for imparting reciprocation to the parallel slides of one set to move the free ends of the conductors passing therethrough into contact position with respect to their respective contacts, electromagnetic means for imparting reciprocation to the intersecting slides to move the conductors into contact with their respective contacts, and means for selectively energizing said electromagnetic devices.

3. An electrical storage device comprising, a pair of plates fixed in spaced relation to each other, a plurality of slides disposed between said plates in parallel relation to each other, a plurality of parallel slides disposed between said plates in intersecting relation with respect to first named slides, an aligned passage through said plates and said slides at the points at which said slides intersect, a contact at each of the passages in one of said plates, a conductor in each of said aligned passages, one end of said conductors being attached to said other plate and having their free ends adjacent their respective contacts, electromagnetic means for imparting reciprocation to the parallel slides of one set to move the free ends of the conductors passing therethrough into contact position with respect to their respective contacts, and electromagnetic means for imparting reciprocation to the intersecting slides to move the conductors into contact with their respective contacts.

4. An electrical storage device comprising, a pair of plates fixed in spaced relation to each other, a plurality of slides disposed between said plates in parallel relation to each other, a plurality of parallel slides disposed between said plates in intersecting relation with respect to first named slides, an aligned passage through said plates and said slides at the points at which said slides intersect, a contact at each of the passages in one of said plates, a conductor in each of said aligned passages, one end of said conductors being attached to said other plate and having their free ends adjacent their respective contacts, means for imparting reciprocation to the parallel slides of one set to move the free ends of the conductors passing therethrough into contact position with respect to their respective contacts, and means for imparting reciprocation to the intersecting slides to move the conductors into contact with their respective contacts.

5. An electrical storage device comprising a pair of plates fixed in spaced relation to each other, a plurality of slides disposed between said plates in parallel relation to each other, a plurality of parallel slides disposed between said plates in intersecting relation with respect to first named slides, an aligned passage through said plates and said slides at the points at which said slides intersect, a contact latch at each of the passages in one of said plates, a flexible conductor in each of said aligned passages, one end of said conductors being attached to said other plate and having their free ends adjacent their respective contact latches, electromagnetic means for imparting longitudinal reciprocation to the parallel slides of one set to move the free ends of the conductors passing therethrough into latching position with respect to their respective contact latches, and electromagnetic means for imparting longitudinal reciprocation to the intersecting slides to flex the conductors into latched contact with their respective contact latches.

6. An electrical storage device comprising, a pair of plates fixed in spaced relation to each other, a plurality of slides disposed between said plates in parallel relation to each other, a plurality of parallel slides disposed between said plates in intersecting relation with respect to first named slides, an aligned passage through said plates and said slides at the points at which said slides intersect, a contact latch at each of the passages in one of said plates, a flexible conductor in each of said aligned passages, one end of said conductors being attached to said other plate and having their free ends adjacent their respective contact latches, means for imparting longitudinal reciprocation to the parallel slides of one set to move the free ends of the conductors passing therethrough into latching position with respect to their respective contact latches, means for imparting longitudinal reciprocation to the intersecting slides to flex the conductors into latched contact with their respective contact latches, and means for impressing an electric current on conductors latched in contact position.

7. An electrical storage device comprising, a pair of plates fixed in spaced relation to each other, a plurality of slides disposed between said plates in parallel relation to each other, a plurality of parallel slides disposed between said plates in intersecting relation with respect to first named slides, an aligned passage through said plates and said slides at the points at which said slides intersect, a contact latch at each of the passages in one of said plates, a flexible conductor in each of said aligned passages, one end of said conductors being attached to said other plate and having their free ends adjacent their respective contact latches, electromagnetic means for imparting longitudinal reciprocation to the parallel slides of one set to move the free ends of the conductors passing therethrough into latching position with respect to their respective contact latches, electromagnetic means for imparting longitudinal reciprocation to the intersecting slides to flex the conductors into latched contact with their respective contact latches, and means for selectively energizing said electromagnetic means.

8. An electrical storage device comprising, a pair of plates fixed in spaced relation to each other, a plurality of slides disposed between said plates in parallel relation to each other, a plurality of parallel slides disposed between said plates in intersecting relation with respect to first named slides, an aligned passage through said plates and said slides at the points at which said slides intersect, a contact latch at each of the passages in one of said plates, a flexible conductor in each of said aligned passages, one end of said conductors being attached to said other plate and having their free ends adjacent their respective contact latches, electromagnetic means for imparting longitudinal reciprocation to the parallel slides of one set to move the free ends of the conductors passing therethrough into latching position with respect to their respective contact latches, electromagnetic means for imparting longitudinal reciprocation to the intersecting slides to flex the conductors into latched contact with their respective contact latches, and means for energizing the electromagnetic means of one set of slides in timed relation to the electromagnetic means of said other set of slides.

9. An electrical storage device comprising, a pair of plates fixed in spaced relation to each other, a slide disposed between said plates, a second slide disposed between said plates in intersecting relation with respect to said first named slide, an aligned passage through said plates and said slides at the point at which said slides intersect, a contact in one of said plates, a flexible conductor extending through said aligned passage, one end of said conductor being anchored to said other plate and having its free end adjacent said contact, means for imparting reciprocation to said first named slide to move the free ends of the conductor passing therethrough into latching position with respect to said contact, and means for imparting reciprocation to the intersecting slide to move the conductor into conducting relation with said contact.

10. An electrical storage device comprising, a pair of plates fixed in spaced relation to each other, a slide disposed between said plates, a second slide disposed between said plates in intersecting relation with respect to said first named slide, an aligned passage through said plates and said slides at the point at which said slides intersect, a contact latch in one of said plates, a flexible conductor extending through said aligned passage, one end of said conductor being anchored to said other plate and having its free end adjacent said contact latch, electromagnetic means for imparting reciprocation to said first named slide to move the free ends of the conductor passing therethrough into latching position with respect to said contact latch, and electromagnetic means for imparting reciprocation to the intersecting slide to flex the conductor into latched contact with said contact latch.

11. An electrical storage device comprising, a pair of plates fixed in spaced relation to each other, a slide disposed between said plates, a second slide disposed between said plates in intersecting relation with respect to said first named slide, an aligned passage through said plates and said slides at the point at which said slides intersect, a contact latch in one of said plates, a flexible conductor extending through said aligned passage, one end of said conductor being anchored to said other plate and having its free end adjacent said contact latch, electromagnetic means for imparting reciprocation to said first named slide to move the free ends of the conductor passing therethrough into latching position with respect to said contact latch, electromagnetic means for imparting reciprocation to the intersecting slide to flex the conductor into latched contact with said contact latch, and means for selectively energizing said electromagnetic means.

12. An electrical storage device comprising, a pair of plates fixed in spaced relation to each other, a slide disposed between said plates, a second slide disposed between said plates in intersecting relation with respect to said first named slide, an aligned passage through said plates and said slides at the point at which said slides intersect, a contact latch in one of said plates, a flexible conductor extending through said aligned passage, one end of said conductor being anchored to said other plate and having its free end adjacent said contact latch, electromagnetic means for imparting reciprocation to said first named slide to move the free ends of the conductor passing therethrough into latching position with respect to said contact latch, electromagnetic means for imparting reciprocation to the intersecting slide to flex the conductor into latched contact with said contact latch, means for selectively energizing said electromagnetic device, and means for impressing an electric impulse on said conductor when in latched position.

ROBERT F. McKIEVER.

REFERENCES CITED

The following references are of record in the file of this patent:

UNITED STATES PATENTS

| Number | Name | Date |
|---|---|---|
| 2,369,430 | Brand et al. | Feb. 13, 1945 |
| 2,405,287 | Brand et al. | Aug. 6, 1946 |
| 2,473,466 | Bitner | June 14, 1949 |